US012651809B2

(12) United States Patent
Liu et al.

(10) Patent No.: US 12,651,809 B2
(45) Date of Patent: Jun. 9, 2026

(54) WELD-FREE BIPOLAR SOLID-STATE BATTERY CELL

(71) Applicant: GM GLOBAL TECHNOLOGY OPERATIONS LLC, Detroit, MI (US)

(72) Inventors: Jingyuan Liu, Shanghai (CN); Sherman H. Zeng, Troy, MI (US); Zhe Li, Shanghai (CN); Qili Su, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 562 days.

(21) Appl. No.: 18/123,008

(22) Filed: Mar. 17, 2023

(65) Prior Publication Data

US 2024/0072390 A1 Feb. 29, 2024

(30) Foreign Application Priority Data

Aug. 23, 2022 (CN) .......................... 202211013024.1

(51) Int. Cl.
H01M 50/536 (2021.01)
H01M 50/54 (2021.01)
H01M 50/548 (2021.01)

(52) U.S. Cl.
CPC ......... H01M 50/536 (2021.01); H01M 50/54 (2021.01); H01M 50/548 (2021.01)

(58) Field of Classification Search
CPC ... H01M 50/536; H01M 50/548; H01M 50/54
See application file for complete search history.

(56) References Cited

U.S. PATENT DOCUMENTS

| | | | |
|---|---|---|---|
| 10,319,978 | B2 | 6/2019 | Zeng et al. |
| 10,658,663 | B2 | 5/2020 | Zhang et al. |
| 10,714,756 | B2 | 7/2020 | Dai et al. |
| 10,944,100 | B2 | 3/2021 | Liu et al. |
| 11,121,375 | B2 | 9/2021 | Hou et al. |
| 11,145,922 | B2 | 10/2021 | Li et al. |
| 11,205,798 | B2 | 12/2021 | Li et al. |

(Continued)

FOREIGN PATENT DOCUMENTS

DE 202014105400 U1 3/2015

OTHER PUBLICATIONS

Qili Su et al.; U.S. Appl. No. 17/710,900, filed Mar. 31, 2022; entitled "Gel Electrolyte System for Solid State Battery"; 76 pages.

(Continued)

*Primary Examiner* — Olatunji A Godo

(57) ABSTRACT

A bipolar battery cell includes a stack including N current collectors, M anode electrodes, S separators, and C cathode electrodes, where N, M, S and C are integers greater than one. A first positioning member is arranged on one side of the stack and includes a first planar portion and a first slot in the first planar portion. A first one of the C current collectors extends through the first slot in the first planar portion and is folded. The first positioning member further includes a first rail portion and a second rail portion. The first rail portion and the second rail portion extend from the first planar portion. A first external tab is arranged between the first rail portion and the second rail portion and connected to the first one of the C current collectors.

19 Claims, 7 Drawing Sheets

(56) References Cited

U.S. PATENT DOCUMENTS

| | | | |
|---|---|---|---|
| 11,217,826 B2 | 1/2022 | Li et al. | |
| 11,295,901 B2 | 4/2022 | Hou et al. | |
| 11,358,647 B1 | 6/2022 | Newcomb et al. | |
| 11,374,257 B2 | 6/2022 | Hou et al. | |
| 11,383,771 B1 | 7/2022 | Newcomb et al. | |
| 11,404,714 B2 | 8/2022 | Hou et al. | |
| 2015/0303436 A1 | 10/2015 | Koetting et al. | |
| 2019/0288343 A1* | 9/2019 | Vu | H01M 4/24 |
| 2020/0280031 A1 | 9/2020 | Zhu et al. | |
| 2020/0403267 A1 | 12/2020 | Li et al. | |
| 2021/0020929 A1 | 1/2021 | Kong et al. | |
| 2021/0036310 A1 | 2/2021 | Hou et al. | |
| 2021/0036360 A1 | 2/2021 | Li et al. | |
| 2021/0050596 A1 | 2/2021 | Li et al. | |
| 2021/0057776 A1 | 2/2021 | Lu et al. | |
| 2021/0111426 A1 | 4/2021 | Li et al. | |
| 2021/0280926 A1 | 9/2021 | Jansen et al. | |
| 2022/0085403 A1* | 3/2022 | Sasaki | H01M 50/512 |
| 2022/0102756 A1 | 3/2022 | Frieberg et al. | |
| 2022/0123352 A1 | 4/2022 | Li et al. | |
| 2022/0140422 A1 | 5/2022 | Chen et al. | |
| 2022/0166031 A1 | 5/2022 | Li et al. | |
| 2022/0181598 A1 | 6/2022 | Lu et al. | |
| 2022/0181685 A1 | 6/2022 | Li et al. | |
| 2022/0212449 A1 | 7/2022 | Newcomb et al. | |
| 2022/0227425 A1 | 7/2022 | Newcomb et al. | |
| 2022/0255130 A1 | 8/2022 | Frieberg | |
| 2022/0263055 A1 | 8/2022 | Hou et al. | |
| 2022/0263129 A1 | 8/2022 | Lu et al. | |

OTHER PUBLICATIONS

Qili Su et al.; U.S. Appl. No. 17/560,673, filed Dec. 23, 2021; entitled "Folded Bipolar Battery Design"; 45 pages.
Zhe Li et al.; U.S. Appl. No. 17/746,575, filed May 17, 2022; titled "Lithiation Additive for Solid-State Battery Including Gel Electrolyte"; 71 pages.
Zhe Li et al.; U.S. Appl. No. 17/683,976, filed Mar. 1, 2022; entitled "Self-Heating Bipolar Solid-State Battery"; 72 pages.
Qili Su et al.; U.S. Appl. No. 17/697,135, filed Mar. 17, 2022; entitled "Methods of Manufacturing Bipolar Solid-State Batteries"; 77 pages.
Jingyuan Liu et al.; U.S. Appl. No. 17/542,974, filed Dec. 6, 2021; titled "Bipolar Capacitor Assisted Battery"; 31 pages.
Yong Lu et al.; U.S. Appl. No. 17/696,567, filed Mar. 16, 2022; entitled "Designs of High-Power Gel-Assisted Bipolar Solid-State Battery"; 64 pages.
Qili Su et al.; U.S. Appl. No. 17/688,445, filed Mar. 7, 2022; entitled "Methods of Fabricating Bipolar Solid State Batteries"; 77 pages.
Bradley R. Frieberg et al.; U.S. Appl. No. 17/551,753, filed Dec. 15, 2021; entitled "Solid Electrolyte Coating of Lithium-Doped Silicon Oxide Particles as Anode Active Material"; 39 pages.
Qi Lu et al.; U.S. Appl. No. 17/698,865, filed Mar. 18, 2022; entitled "Bipolar Current Collector and Method of Making the Same"; 48 pages.
Zhe Li et al.; U.S. Appl. No. 17/707,524, filed Mar. 29, 2022; entitled "Argyrodite Solid Electrolytes for Solid-State Batteries and Methods of Making the Same"; 56 pages.
Qili Su et al.; U.S. Appl. No. 17/710,213, filed Mar. 31, 2022; entitled "Polymeric Gel Electrolyte Systems for High-Power Solid-State Battery"; 62 pages.
Zhe Li et al.; U.S. Appl. No. 17/738,767, filed May 6, 2022; entitled "Gel Polymer Electrolyte for Electrochemical Cell"; 38 pages.
Zhe Li et al.; U.S. Appl. No. 17/458,903, filed Aug. 27, 2021; entitled "Anode-Free Solid-State Battery and Method of Battery Fabrication"; 28 pages.
Zhe Li et al.; U.S. Appl. No. 17/884,226, filed Aug. 9, 2022; entitled "Thin Solid-State Electrolyte Having High Ionic Conductivity"; 58 pages.
Yong Lu et al.; U.S. Appl. No. 17/884,410, filed Aug. 9, 2022; entitled "Fabrication Process For Polymer-Based Bipolar Batteries Via In-Situ Polymerization"; 58 pages.
Zhe Li et al.; U.S. Appl. No. 17/884,419, filed Aug. 9, 2022; entitled "Polymeric Gel Electrolytes For High-Power Batteries"; 61 pages.
German Office Action from counterpart DE1020231029789, dated Nov. 15, 2024.

* cited by examiner

WELD-FREE BIPOLAR SOLID-STATE BATTERY CELL

CROSS-REFERENCE TO RELATED APPLICATIONS

This application claims the benefit of Chinese Patent Application No. 202211013024.1, filed on Aug. 23, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery cells, and more particularly to bipolar solid-state battery cells.

Electric vehicles (EVs) such as battery electric vehicles (BEVs), hybrid vehicles, and/or fuel cell vehicles include one or more electric machines and a battery system including one or more battery cells, modules and/or packs. A power control system is used to control power to/from the battery system during charging, propulsion and/or regeneration.

Bipolar solid-state battery cells with a stacked architecture can produce high output voltages (e.g., 12V) in each battery cell. In this design, fewer current collectors are connected to external tabs by welding. Generally, the outermost current collectors are connected. This type of connection is mechanically weaker and therefore has reduced durability. Because there are fewer current collectors connected to the external tabs, current density is higher on welded portions of the bipolar solid-state battery cell as compared to monopolar solid-state battery cells. The higher current density leads to hot spots, which reduces durability.

SUMMARY

A bipolar battery cell includes a stack including N current collectors, M anode electrodes, S separators, and C cathode electrodes, where N, M, S and C are integers greater than one. A first positioning member is arranged on one side of the stack and includes a first planar portion and a first slot in the first planar portion. A first one of the C current collectors extends through the first slot in the first planar portion and is folded. The first positioning member further includes a first rail portion and a second rail portion. The first rail portion and the second rail portion extend from the first planar portion. A first external tab is arranged between the first rail portion and the second rail portion and connected to the first one of the C current collectors.

In other features, the first slot extends in a direction parallel to the first rail portion and the second rail portion. The first rail portion and the second rail portion extend in a direction transverse to a stacking direction of the stack. The first slot extends in a direction transverse to the first rail portion and the second rail portion. The first rail portion and the second rail portion extend in a direction parallel to a stacking direction of the stack.

In other features, the first positioning member is made of an insulating material and includes a conducting layer arranged between the first rail portion and the second rail portion.

In other features, the first positioning member is made of a conducting material and includes an insulating material arranged on a surface of the first positioning member adjacent to the stack. The first external tab includes a second planar portion and a third portion connected to and extending transversely from the second planar portion.

In other features, the first positioning member further comprises a plurality of slots. At least some of the others of the C current collectors extend through the plurality of slots in the first planar portion and are folded.

In other features, the first external tab includes an insulating substrate and a plurality of conducting layers arranged on one side of the insulating substrate. The plurality of conducting layers is connected to a plurality of the C current collectors, respectively. A plurality of conducting portions extend through the insulating substrate and are connected to and extend transversely from the plurality of conducting layers, respectively.

In other features, a second positioning member is arranged on an opposite side of the stack and includes a second planar portion and a second slot in the second planar portion. A second one of the C current collectors extends through the second slot in the second planar portion and is folded. The second positioning member includes a third rail portion and a fourth rail portion, wherein the third rail portion and the fourth rail portion extend from the second planar portion. A second external tab is engaged between the third rail portion and the fourth rail portion and is connected to the second one of the C current collectors. The first one of the C current collectors and the second one of the C current collectors correspond to outermost ones of the C current collectors.

In other features, the first planar portion of the first positioning member includes a second slot in the first planar portion. A second one of the C current collectors extends through the second slot in the first planar portion and is folded transversely. A second external tab is arranged between the first rail portion and the second rail portion and connected to the second one of the C current collectors. The first one of the C current collectors and the second one of the C current collectors correspond to outermost ones of the C current collectors.

A bipolar battery cell comprises a stack including N current collectors, M anode electrodes, S separators, and C cathode electrodes, where N, M, S and C are integers greater than one. A first positioning member is arranged on one side of the stack and includes a first planar portion and a first slot in the first planar portion. A first one of the C current collectors extends through the first slot in the first planar portion and is folded. The first positioning member includes a first rail portion and a second rail portion. The first rail portion and the second rail portion extend from the first planar portion. A first external tab is arranged between the first rail portion and the second rail portion and is connected to the first one of the C current collectors. A second positioning member is arranged on an opposite side of the stack and includes a second planar portion and a second slot in the second planar portion. A second one of the C current collectors extends through the second slot in the second planar portion and is folded. The second positioning member includes a third rail portion and a fourth rail portion, wherein the third rail portion and the fourth rail portion extend from the second planar portion. A second external tab is engaged between the third rail portion and the fourth rail portion and is connected to the second one of the C current collectors.

The first one of the C current collectors and the second one of the C current collectors correspond to outermost ones of the C current collectors.

In other features, the first slot extends in a direction parallel to the first rail portion and the second rail portion. The first rail portion and the second rail portion extend in a direction transverse to a stacking direction of the stack.

In other features, the first slot extends in a direction transverse to the first rail portion and the second rail portion. The first rail portion and the second rail portion extend in a direction parallel to a stacking direction of the stack.

In other features, the first positioning member is made of an insulating material and includes a conducting layer arranged between the first rail portion and the second rail portion. The first positioning member is made of a conducting material and includes an insulating material arranged on a surface of the first positioning member adjacent to the stack.

A bipolar battery cell comprises a stack including N current collectors, M anode electrodes, S separators, and C cathode electrodes, where N, M, S and C are integers greater than one. A first positioning member is arranged on one side of the stack and includes a first planar portion and a first slot in the first planar portion. A first one of the C current collectors extends through the first slot in the first planar portion and is folded. The first positioning member includes a second slot in the first planar portion. A second one of the C current collectors extends through the second slot in the first planar portion and is folded. The first positioning member further includes a first rail portion and a second rail portion. The first rail portion and the second rail portion extend from the first planar portion. A first external tab arranged between the first rail portion and the second rail portion and connected to the first one of the C current collectors. A second external tab is arranged between the first rail portion and the second rail portion and connected to the second one of the C current collectors. The first one of the C current collectors and the second one of the C current collectors correspond to outermost ones of the C current collectors. The first slot extends in a direction parallel to the first rail portion and the second rail portion. The first rail portion and the second rail portion extend in a direction transverse to a stacking direction of the stack.

In other features, the first slot extends in a direction transverse to the first rail portion and the second rail portion. The first rail portion and the second rail portion extend in a direction parallel to a stacking direction of the stack.

In other features, the first positioning member is made of an insulating material and includes a conducting layer arranged between the first rail portion and the second rail portion. The first positioning member is made of a conducting material and includes an insulating material arranged on a surface of the first positioning member adjacent to the stack.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

While the battery cells according to the present disclosure are described in the context of use in a vehicle, the battery cells can be used in non-vehicle applications.

Figure 2:
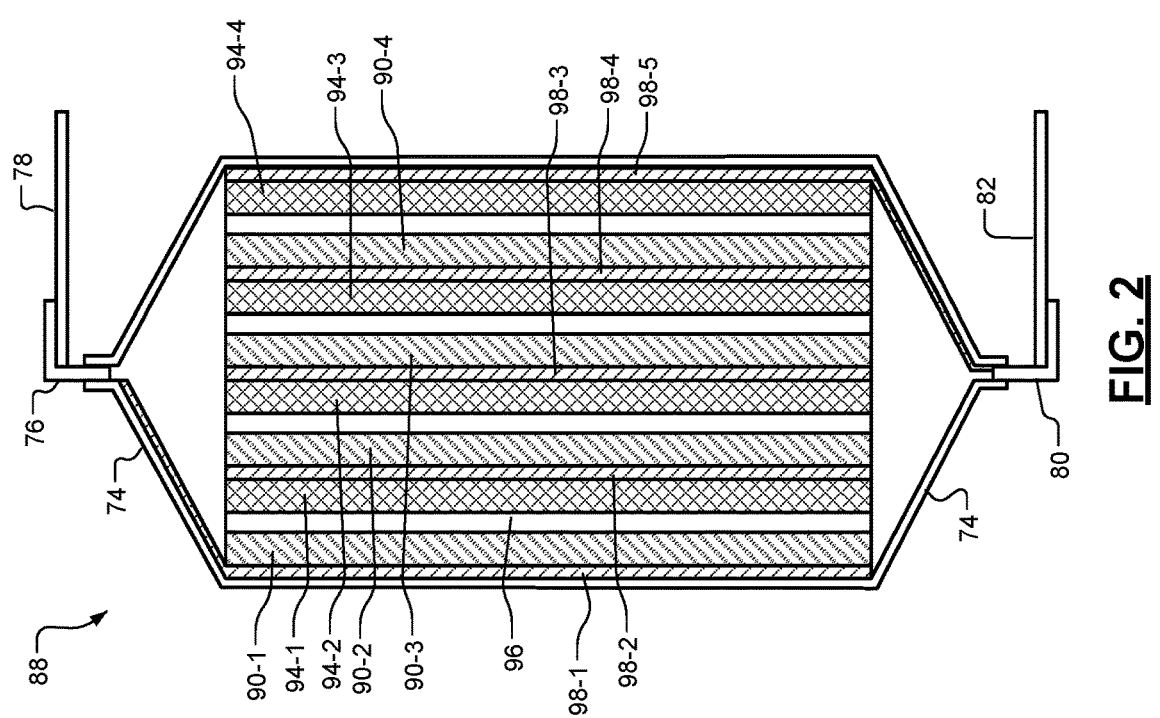
FIG. 2 is a side cross-sectional view of a bipolar solid-state battery.
Figure 1:
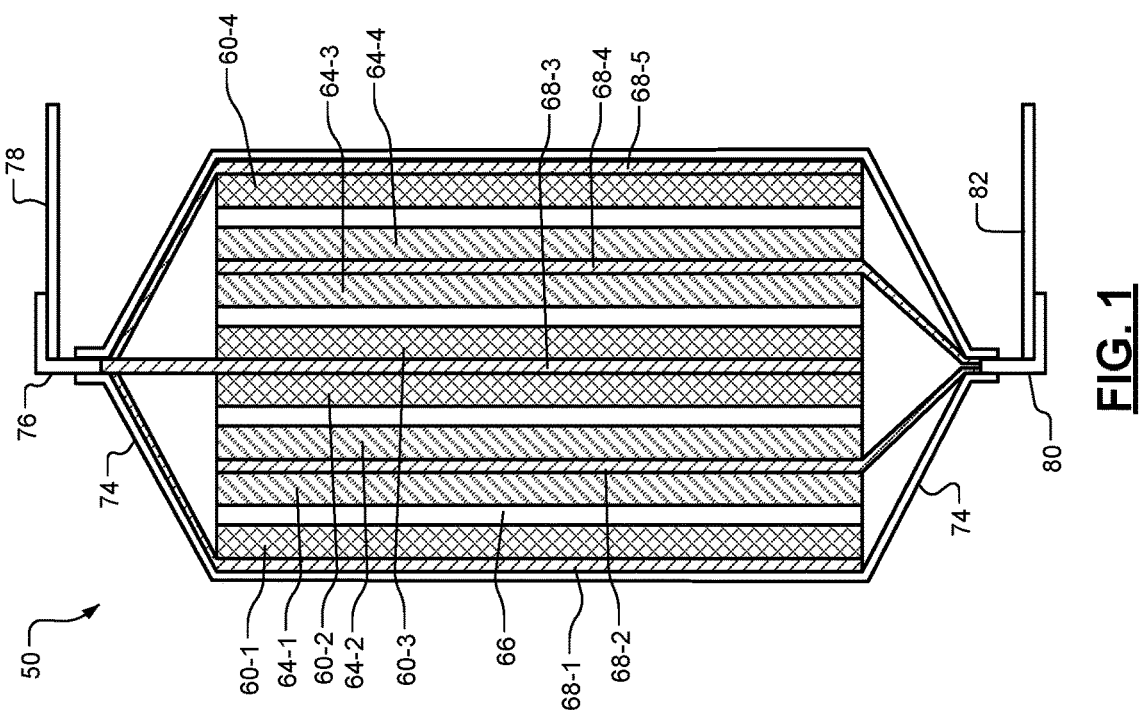
FIG. 1 is a side cross-sectional view of a monopolar solid-state battery.

Referring now to FIGS. 1 and 2, monopolar and bipolar solid-state battery cells, respectively, are shown. In FIG. 1, a battery cell 50 has a monopolar or parallel configuration. The battery cell 50 is shown to include anode electrodes 60-1, 60-2, 60-3 and 60-4 (collectively or individually anode electrode(s) 60), cathode electrodes 64-1, 64-2, 64-3 and 64-4 (collectively or individually cathode electrode(s) 64), separators 66, and current collectors 68-1, 68-2, 68-3, 68-4, and 68-5 (collectively or individually current collector(s) 68).

The battery cell 50 further includes an enclosure 74 such as a plastic encapsulation layer. An external tab 76 provides a connection between the current collectors 68-1, 68-3 and 68-5 and a positive busbar 78. An external tab 80 provides a connection from the current collectors 68-2 and 68-4 to a negative busbar 82.

The battery cell 50 includes the current collector 68-1 arranged adjacent to the anode electrode 60-1. The separator 66 is arranged between the anode electrode 60-1 and the cathode electrode 64-1. The current collector 68-2 is arranged adjacent to the cathode electrode 64-1. Then, the pattern reverses. The cathode electrode 64-2 is arranged adjacent to the current collector 68-2. The separator 66 is arranged adjacent to the cathode electrode 64-2. The anode electrode 60-2 is arranged adjacent to the separator 66. The separator 66 is arranged adjacent to the anode electrode 60-2. Then, the pattern repeats.

In FIG. 2, a battery cell 88 is configured in a bipolar or series configuration. The battery cell 88 is shown to include anode electrodes 90-1, 90-2, 90-3 and 90-4 (collectively or individually anode electrode(s) 90), cathode electrodes 94-1, 94-2, 94-3 and 94-4 (collectively or individually cathode electrode(s) 94), separators 96, and current collectors 98-1, 98-2, 98-3, 98-4, and 98-5 (collectively or individually current collector(s) 98).

The battery cell 88 includes the current collector 98-1 arranged adjacent to the anode electrode 90-1. The separator 96 is arranged between the anode electrode 90-1 and the cathode electrode 94-1. The current collector 98-2 is arranged adjacent to the cathode electrode 94-1. Then, the pattern repeats.

As can be appreciated, both FIGS. 1 and 2 include N=4 cathode electrodes and anode electrodes and N+1 current collectors. Additional or fewer electrodes and current collectors can be used depending upon the application. As can be seen when comparing FIGS. 1 and 2, the bipolar configuration has fewer current collectors connected to the external tab corresponding to the positive lead as compared to the monopolar configuration (e.g., 1 vs. 3 in this example). The bipolar configuration has fewer current collectors connected to the external tab corresponding to the negative lead as compared to the monopolar configuration (e.g., 1 vs. 2 in this example).

Advantages of the bipolar configuration include higher power performance and high voltage output from one battery cell. Disadvantages include a stronger stretching force on welded connections for the bipolar configuration as compared to the monopolar configuration. There are fewer current collector layers to handle the external force, which makes the connection less robust. During high-current-related applications (e.g., 10° C. cold-cranking or fast charging), the current density (together with a high output potential) on the welded portion in the bipolar configuration also causes hot spots, which reduce durability.

Figure 3B:
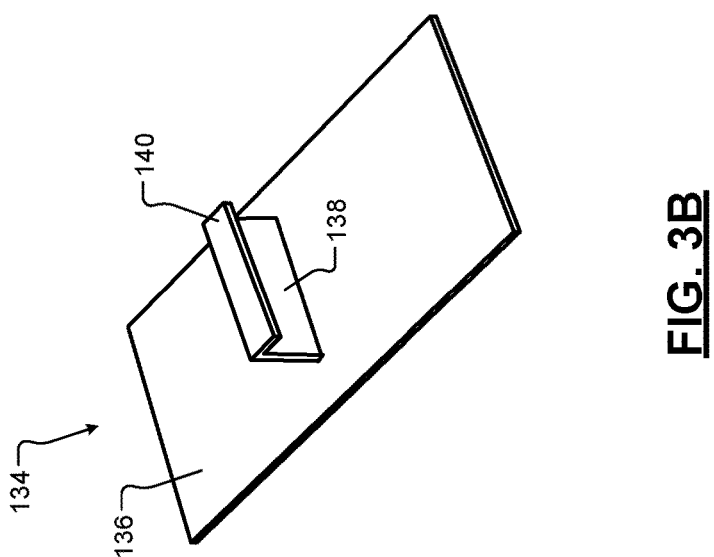
FIG. 3B is a perspective view illustrating an example of an external tab according to the present disclosure.
Figure 3A:
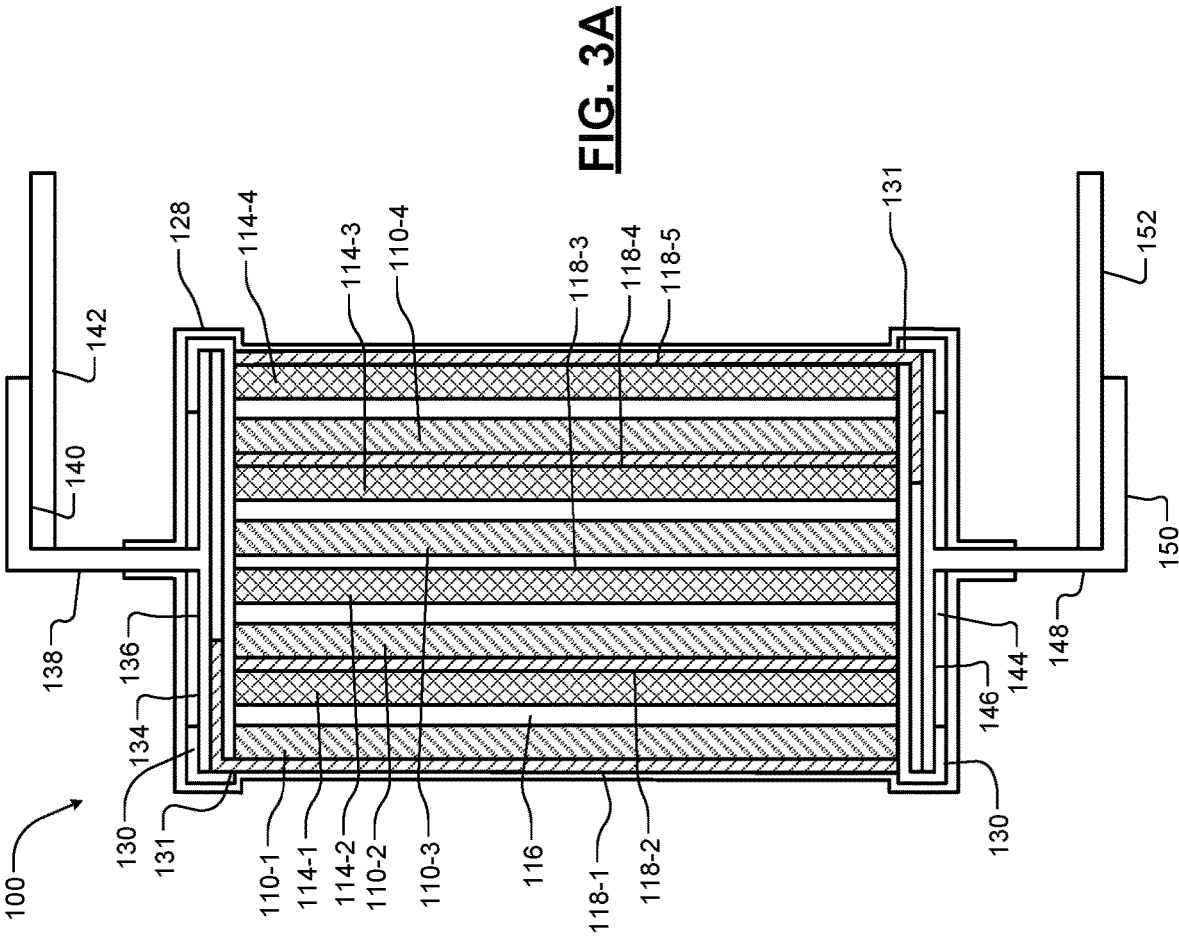
FIG. 3A is a side cross-sectional view of an example of a bipolar solid-state battery including a positioning member with rail portions extending transverse to a stacking direction according to the present disclosure.

Referring now to FIGS. 3A to 5B, an example of a bipolar battery cell 100 is shown. In some examples, the bipolar battery cell 100 is solid-state. In FIG. 3A, the bipolar battery cell 100 is configured in a bipolar or series configuration. The bipolar battery cell 100 is shown to include anode electrodes 110-1, 110-2, 110-3 and 110-4 (collectively or individually anode electrode(s) 110), cathode electrodes 114-1, 114-2, 114-3 and 114-4 (collectively or individually cathode electrode(s) 114), separators 116, and current collectors 118-1, 118-2, 118-3, 118-4, and 118-5 (collectively or individually current collector(s) 118).

The bipolar battery cell 100 includes the current collector 118-1 arranged adjacent to the anode electrode 110-1. The separator 116 is arranged between the anode electrode 110-1 and the cathode electrode 114-1. The current collector 118-2 is arranged adjacent to the cathode electrode 114-1. Then, the pattern repeats.

The bipolar battery cell 100 includes an enclosure 128 such as a plastic encapsulation layer. A positioning member 130 is arranged at the top and bottom of the anode electrodes 110 and the cathode electrodes 114. In FIGS. 3A and 3B, the current collector 118-1 passes through a slot 131 in the positioning member 130 and an end thereof is folded (e.g., transversely).

An external tab 134 is arranged in contact with the current collector 118-1. The external tab 134 includes a first planar portion 136 (extending horizontally in FIG. 3) in contact with the end of the current collector 118-1. In some examples, the first planar portion 136 has a thickness in a range from 0.08 mm to 2 mm.

The external tab 134 includes a second portion 138 extending transverse (or vertically in FIG. 3A) to the first planar portion 136. A third portion 140 of the external tab 134 extends transversely (or horizontally in FIG. 3) to the second portion 138 and is connected to the positive busbar 142.

The current collector 118-5 passes through the slot 131 in the positioning member 130 (at the bottom of the battery cell) and an end thereof is folded (e.g., transversely). An external tab 144 is arranged in contact with the current collector 118-1. The external tab 144 includes a first planar portion 146 (extending horizontally in FIG. 3A) in contact with the end of the current collector 118-5. The external tab 144 includes a second portion 148 extending transverse (or vertically in FIG. 3A) to the first planar portion 146. A third portion 150 of the external tab 144 extends transverse (or horizontally in FIG. 3A) to the second portion 148 and is connected to the negative busbar 152.

Figures 4, 6:
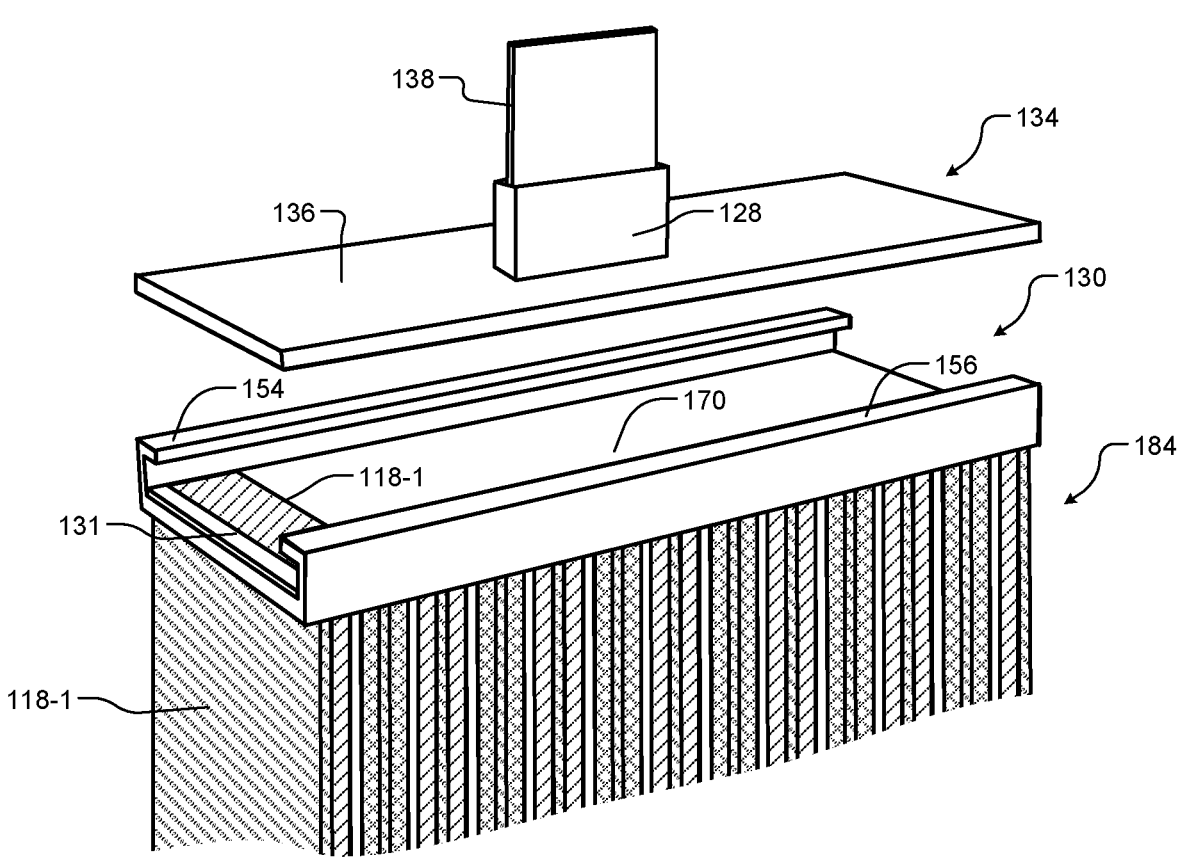
FIG. 4 is a perspective view illustrating an example of a positioning member according to the present disclosure.
FIG. 6 is a perspective view illustrating another example of a bipolar solid-state battery including a positioning member with rail portions extending in a stacking direction according to the present disclosure.

In FIGS. 3A and 4 to 5B, examples of the positioning member 130 are shown. In FIGS. 3A and 4, the positioning member 130 is shown to have a "C"-shaped cross-section. The positioning member 130 includes a first rail portion 154 and a second rail portion 156 located at opposite ends thereof and a planar portion 158 located therebetween. In some examples, the first rail portion 154 and second rail portion 156 are located along shorter sides of the battery cell as shown. In other words, the first rail portion 154 and the second rail portion 156 extend in a direction transverse to the stacking direction. In other examples, the first rail portion 154 and the second rail portion 156 are located along longer sides of the battery cell (and extend in a direction parallel to the stacking direction) (FIG. 6). In some examples, the slot 131 is arranged in the planar portion 158 adjacent to one of the first rail portion 154 and the second rail portion 156 and extends in a parallel direction thereto.

In some examples, the slot 131 has a width in a range from 10 μm to 1000 μm. In some examples, the slot 131 extends a predetermined distance less than or equal to a width of the current collectors in a direction transverse to the stacking direction. In some examples, a height of the first and second rail portions is in a range from 0.1 mm to 2 mm, although other values may be used.

Figures 5A, 5B:
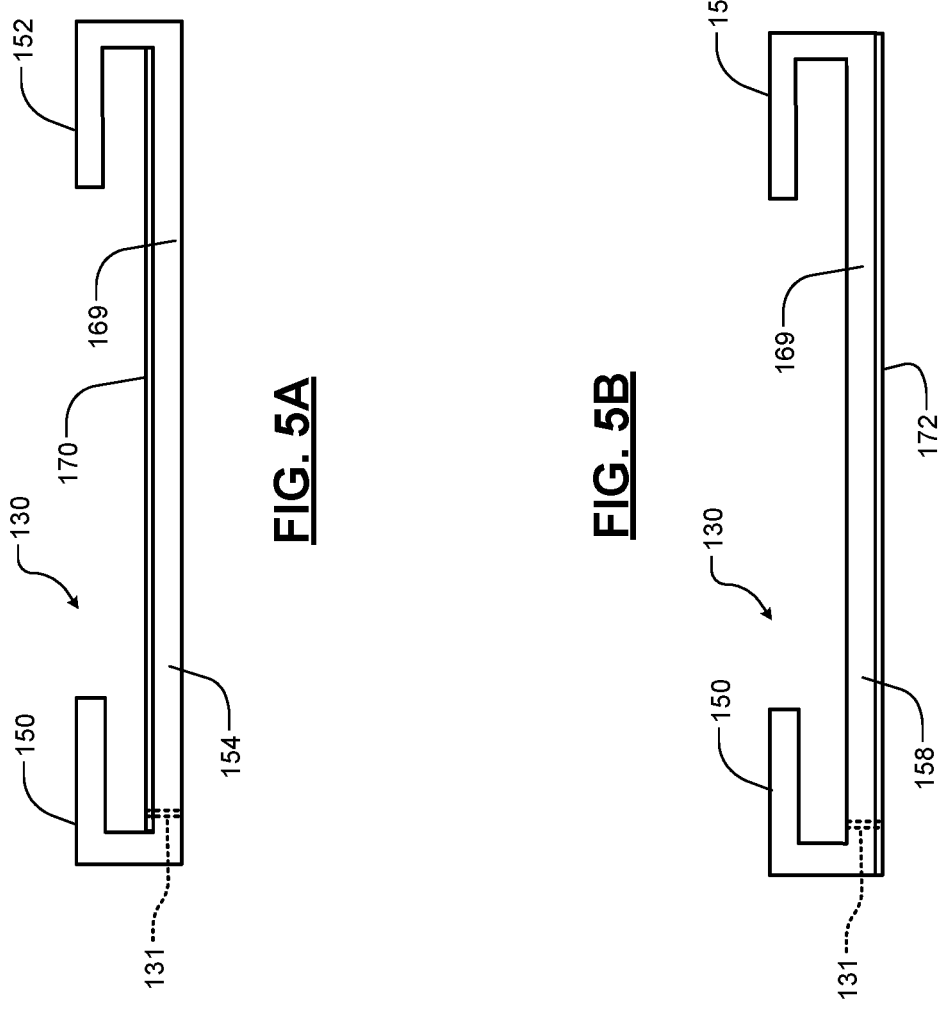
FIGS. 5A and 5B are side views illustrating examples of positioning members according to the present disclosure.

In FIG. 5A, a body 169 of the positioning member 130 is made of an insulating material and includes a conducting layer 170 along a top side of the planar portion 158 between the rail portions. In some examples, the insulating material is selected from a group consisting of plastic, polyolefin such as polypropylene, polytetrafluoroethylene (PTFE)), or other suitable insulating material.

In FIG. 5B, the body 169 of the positioning member 130 is made of a conducting material and includes a non-conducting portion 172 along a bottom surface of the positioning member 130 adjacent to the planar portion 158.

Referring now to FIG. 6, the first rail portion 154 and the second rail portion 156 can also extend in a stacking direction of a battery cell 184. As can be appreciated, the slot 131 extends transversely between the first rail portion 154 and the second rail portion 156 rather than parallel to the first and second rail portions as shown above. In some examples, conducting glues are used to enhance conducting contact.

Advantages of the weld-free bipolar battery cell include mechanical robustness. Wider contact area increases allowable current density. The weld-free bipolar battery cell provides enhanced contact areas between the current collectors and the external tabs. The welding-free bipolar battery cell protects the bipolar current collectors from contacting each other to avoid short circuits.

Figures 7, 8:
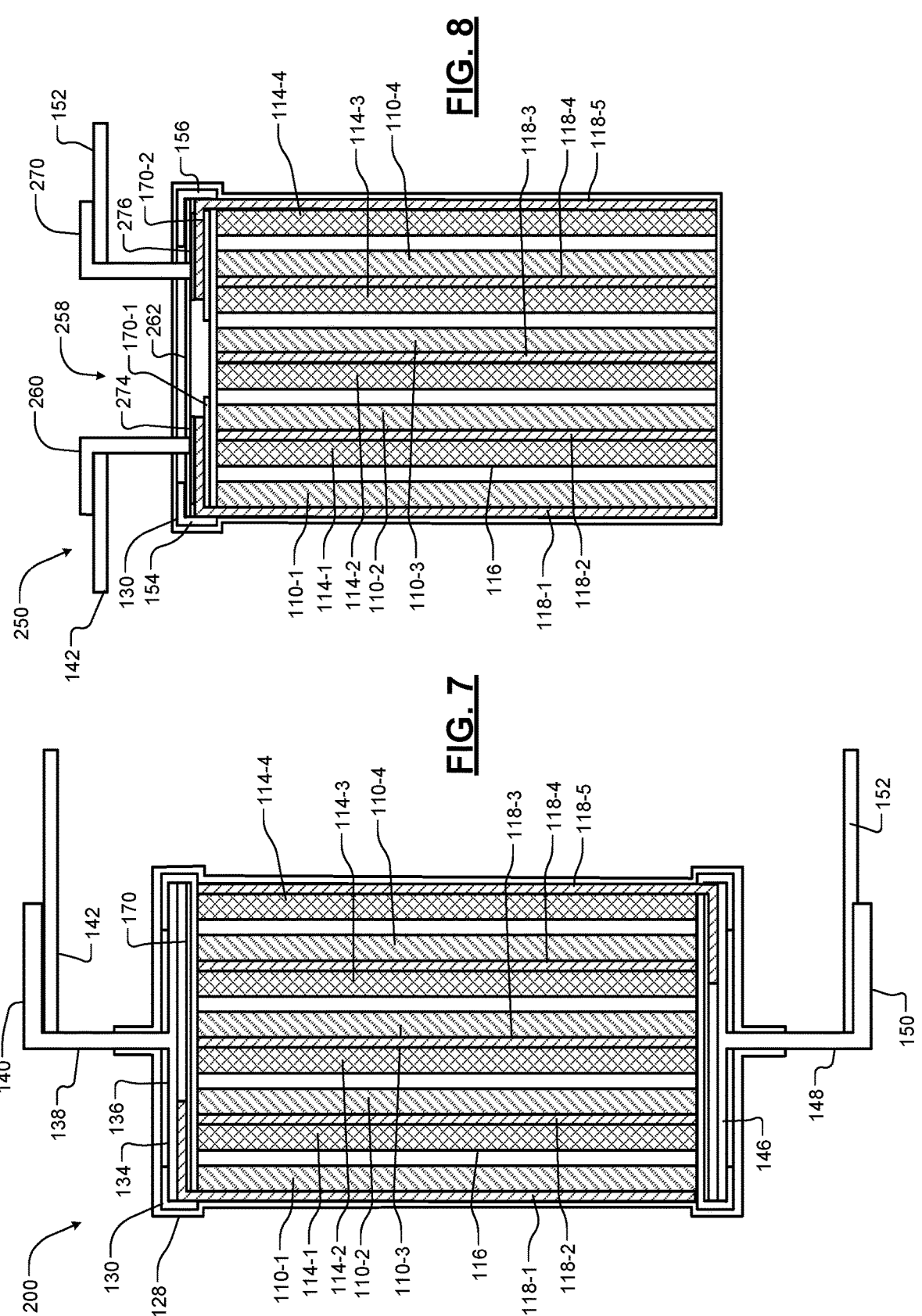
FIG. 7 is a side cross-sectional view of another example of a bipolar solid-state battery in a symmetric configuration according to the present disclosure.
FIG. 8 is a side cross-sectional view of another example of a bipolar solid-state battery in an asymmetric configuration according to the present disclosure.

Referring now to FIGS. 7 and 8, symmetric and asymmetric configurations can be used. In FIG. 7, a battery cell 200 has a symmetric configuration with positive and negative connections located at opposite sides of the battery cell 200. In FIG. 8, a battery cell 250 has an asymmetric configuration with positive and negative connections located at the same side of the battery cell 250. The conducting layer 170 is split into a first portion 170-1 and a second portion 170-2 that are not electrically connected. In some examples, a distance between the first portion 170-1 and the second portion 170-2 is sufficient to prevent conducting contact of the current collectors 118-1 and 118-5 when folded. A connector 258 includes an insulating substrate 262, first and second external tabs 260 and 270 that are connected by conducting plates 274 and 276 to the current collector 118-1 and the current collector 118-5, respectively.

Figure 10:
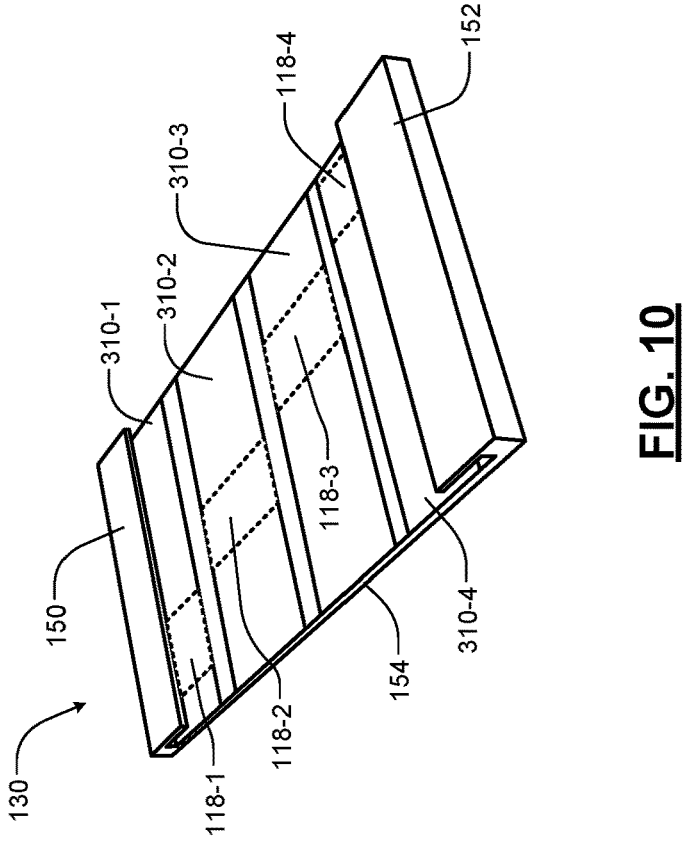
FIG. 10 is a side cross-sectional view of another example of a positioning member according to the present disclosure.
Figure 9:
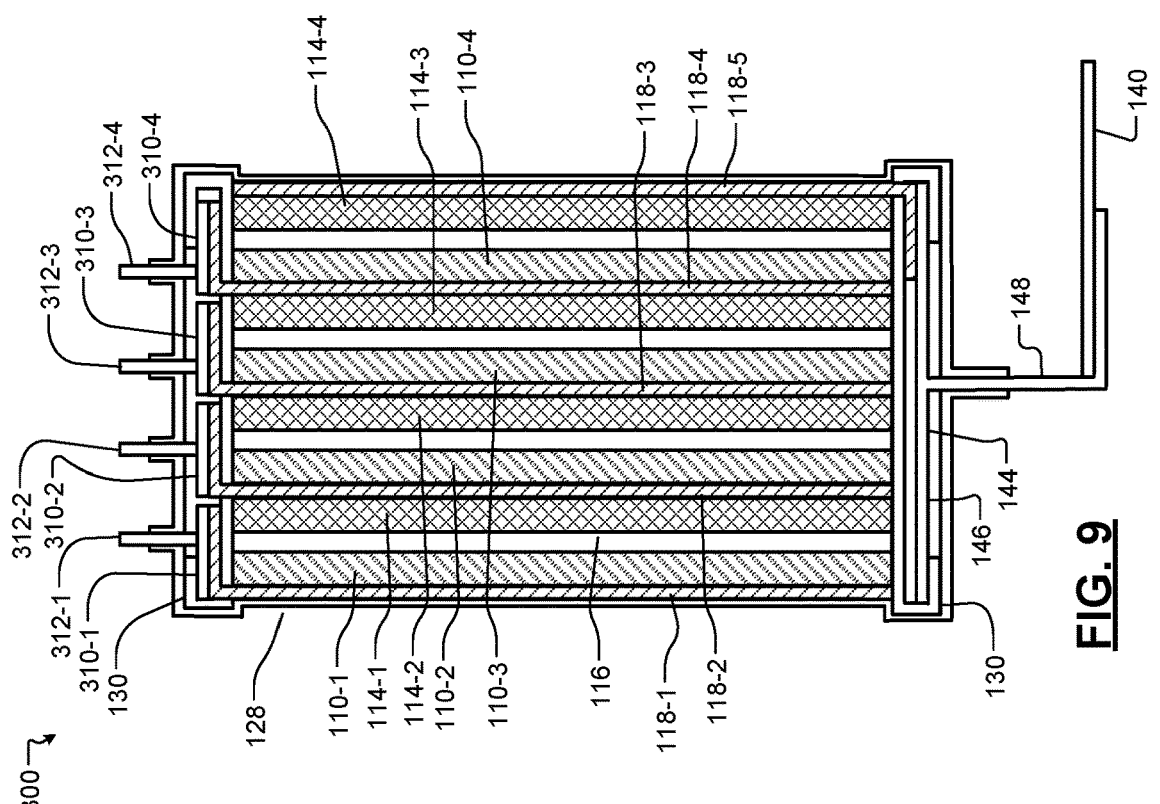
FIG. 9 is a side cross-sectional view of an example of a bipolar solid-state battery in a symmetric configuration according to the present disclosure.

Referring now to FIGS. 9 and 10, the battery cells described above have a bipolar configuration. Therefore, the voltages sum from one side of the battery cell (connected to ground or another reference potential) to the opposite side of the battery cell. In FIG. 9, a battery cell 300 includes multiple external tabs connected to the current collectors 118-1 to 118-4. The current collector 118-5 is connected to ground. In FIG. 10, conducting portions 310-1, 310-2, 310-3 and 310-4 (collectively conducting portions 310) are arranged on a surface of the third portion 150 and insulated relative to adjacent conducting portions 310 to allow separate connections thereto.

Figure 11:
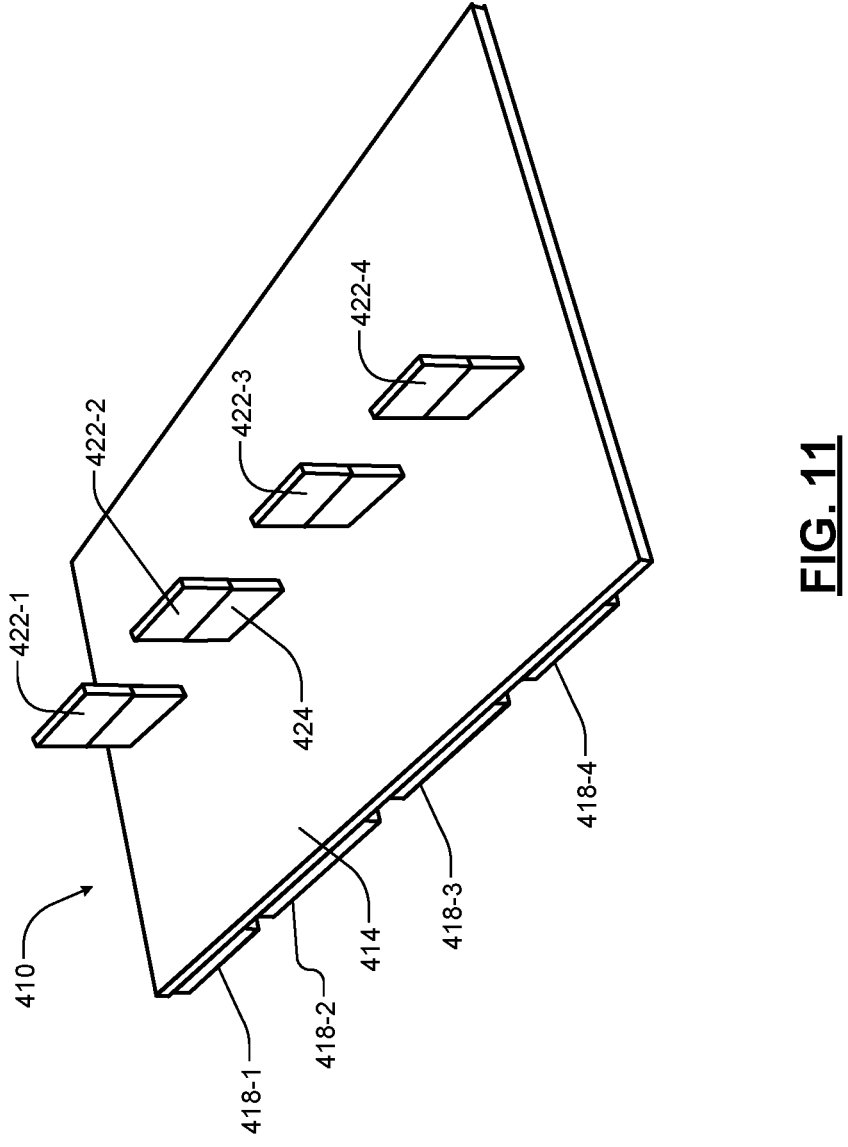
FIG. 11 is a perspective view illustrating another example of an external tab according to the present disclosure.

Referring now to FIG. 11, an external connection 410 with multiple reference tabs is shown to include an insulating substrate 414. Conducting layers 418-1, 418-2, 418-3, and 418-4 are spaced apart and extend between sides of the insulating substrate 414 along a bottom surface thereof. Conducting tab portions 422-1, 422-2, 422-3, and 422-4 extend through the insulating substrate 414 and connect with the conducting layers 418-1, 418-2, 418-3, and 418-4, respectively. A seal layer 424 extends along lower portions of the conducting tab portions 422-1, 422-2, 422-3, and 422-4. As can be appreciated, the conducting tab portions 422-1, 422-2, 422-3, and 422-4 can be used to monitor voltages at collectors within the battery cell (e.g., 12V, 9V, 6V, and 3V, respectively, for a 12V bipolar battery cell).

As can be appreciated, the conducting tab portions 422-1, 422-2, 422-3, and 422-4 provide additional references tab between the bipolar cell units to track the voltage status and battery state of health (SOH).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A bipolar battery cell comprising:
a stack including C current collectors, M anode electrodes, S separators, and N cathode electrodes, where N, M, S and C are integers greater than one;
a first positioning member arranged on one side of the stack and including:
a first planar portion;
a first slot in the first planar portion, wherein a first one of the C current collectors extends through the first slot in the first planar portion and is folded;
a first rail portion; and
a second rail portion, wherein the first rail portion and the second rail portion extend from the first planar portion; and
a first external tab arranged between the first rail portion and the second rail portion and connected to the first one of the C current collectors, wherein the first external tab includes a second planar portion, and a third portion connected to and extending transversely from the second planar portion.

2. The bipolar battery cell of claim 1, wherein:
the first slot extends in a direction parallel to the first rail portion and the second rail portion; and
the first rail portion and the second rail portion extend in a direction transverse to a stacking direction of the stack.

3. The bipolar battery cell of claim 1, wherein:
the first slot extends in a direction transverse to the first rail portion and the second rail portion; and
the first rail portion and the second rail portion extend in a direction parallel to a stacking direction of the stack.

4. The bipolar battery cell of claim 1, wherein the first positioning member is made of an insulating material and includes a conducting layer arranged between the first rail portion and the second rail portion.

5. The bipolar battery cell of claim 1, wherein the first positioning member is made of a conducting material and includes an insulating material arranged on a surface of the first positioning member adjacent to the stack.

6. The bipolar battery cell of claim 1, wherein the first positioning member further comprises a plurality of slots and wherein at least some of the others of the C current collectors extend through the plurality of slots in the first planar portion and are folded.

7. The bipolar battery cell of claim 6, wherein the first external tab includes:

an insulating substrate;

a plurality of conducting layers arranged on one side of the insulating substrate, wherein the plurality of conducting layers is connected to a plurality of the C current collectors, respectively; and a plurality of conducting portions extending through the insulating substrate and connected to and extending transversely from the plurality of conducting layers, respectively.

8. The bipolar battery cell of claim 1, further comprising:

a second positioning member arranged on an opposite side of the stack and including:

a third planar portion;

a second slot in the third planar portion, wherein a second one of the C current collectors extends through the second slot in the third planar portion and is folded;

a third rail portion; and a fourth rail portion, wherein the third rail portion and the fourth rail portion extend from the third planar portion; and a second external tab engaged between the third rail portion and the fourth rail portion and connected to the second one of the C current collectors, wherein the first one of the C current collectors and the second one of the C current collectors correspond to outermost ones of the C current collectors.

9. The bipolar battery cell of claim 1, wherein:

the first planar portion of the first positioning member includes a second slot in the first planar portion;

a second one of the C current collectors extends through the second slot in the first planar portion and is folded transversely; and a second external tab arranged between the first rail portion and the second rail portion and connected to the second one of the C current collectors, wherein the first one of the C current collectors and the second one of the C current collectors correspond to outermost ones of the C current collectors.

10. A bipolar battery cell comprising:

a stack including C current collectors, M anode electrodes, S separators, and N cathode electrodes, where N, M, S and C are integers greater than one;

a first positioning member arranged on one side of the stack and including:

a first planar portion;

a first slot in the first planar portion, wherein a first one of the C current collectors extends through the first slot in the first planar portion and is folded;

a first rail portion; and a second rail portion, wherein the first rail portion and the second rail portion extend from the first planar portion;

a first external tab arranged between the first rail portion and the second rail portion and connected to the first one of the C current collectors;

a second positioning member arranged on an opposite side of the stack and including:

a second planar portion;

a second slot in the second planar portion, wherein a second one of the C current collectors extends through the second slot in the second planar portion and is folded;

a third rail portion; and a fourth rail portion, wherein the third rail portion and the fourth rail portion extend from the second planar portion; and a second external tab engaged between the third rail portion and the fourth rail portion and connected to the second one of the C current collectors, wherein the first one of the C current collectors and the second one of the C current collectors correspond to outermost ones of the C current collectors.

11. The bipolar battery cell of claim 10, wherein:

the first slot extends in a direction parallel to the first rail portion and the second rail portion; and the first rail portion and the second rail portion extend in a direction transverse to a stacking direction of the stack.

12. The bipolar battery cell of claim 10, wherein:

the first slot extends in a direction transverse to the first rail portion and the second rail portion; and the first rail portion and the second rail portion extend in a direction parallel to a stacking direction of the stack.

13. The bipolar battery cell of claim 10, wherein the first positioning member is made of an insulating material and includes a conducting layer arranged between the first rail portion and the second rail portion.

14. The bipolar battery cell of claim 10, wherein the first positioning member is made of a conducting material and includes an insulating material arranged on a surface of the first positioning member adjacent to the stack.

15. A bipolar battery cell comprising:

a stack including C current collectors, M anode electrodes, S separators, and N cathode electrodes, where N, M, S and C are integers greater than one;

a first positioning member arranged on one side of the stack and including:

a first planar portion;

a first slot in the first planar portion, wherein a first one of the C current collectors extends through the first slot in the first planar portion and is folded;

a second slot in the first planar portion, wherein a second one of the C current collectors extends through the second slot in the first planar portion and is folded;

a first rail portion; and a second rail portion, wherein the first rail portion and the second rail portion extend from the first planar portion;

a first external tab arranged between the first rail portion and the second rail portion and connected to the first one of the C current collectors; and a second external tab arranged between the first rail portion and the second rail portion and connected to the second one of the C current collectors, wherein the first one of the C current collectors and the second one of the C current collectors correspond to outermost ones of the C current collectors.

16. The bipolar battery cell of claim 15, wherein:

the first slot extends in a direction parallel to the first rail portion and the second rail portion; and the first rail portion and the second rail portion extend in a direction transverse to a stacking direction of the stack.

17. The bipolar battery cell of claim 15, wherein:

the first slot extends in a direction transverse to the first rail portion and the second rail portion; and the first rail portion and the second rail portion extend in a direction parallel to a stacking direction of the stack.

18. The bipolar battery cell of claim 15, wherein the first positioning member is made of an insulating material and includes a conducting layer arranged between the first rail portion and the second rail portion.

19. The bipolar battery cell of claim 15, wherein the first positioning member is made of a conducting material and includes an insulating material arranged on a surface of the first positioning member adjacent to the stack.

* * * * *